United States Patent [19]
Tisbo et al.

[11] Patent Number: 5,372,415
[45] Date of Patent: Dec. 13, 1994

[54] THERMOPLASTIC LOCKER CONSTRUCTION

[75] Inventors: Thomas A. Tisbo, Barrington; Stephen P. Whitehead, Elgin; Lyle A. Rosine, Aurora, all of Ill.

[73] Assignee: Suncast Corporation, Batavia, Ill.

[21] Appl. No.: 64,267

[22] Filed: May 18, 1993

[51] Int. Cl.⁵ .................................. A47B 87/02
[52] U.S. Cl. .................... 312/108; 312/109; 312/234.3; 312/245; 312/263; 108/109; 403/231; 403/252; 403/326; 411/510
[58] Field of Search ............ 312/107, 108, 109, 234.1, 312/234.3, 245, 257.1, 263; 108/107, 109; 411/509, 510, 913; 403/231, 252, 326, 329

[56] References Cited

U.S. PATENT DOCUMENTS

| | | | |
|---|---|---|---|
| 2,047,454 | 7/1936 | Anderson et al. | 312/257.1 |
| 3,722,971 | 3/1973 | Zeischegg | 312/109 |
| 3,847,458 | 11/1974 | Nowak | 312/108 |
| 3,969,006 | 7/1976 | Brown | 312/234.1 |
| 3,989,397 | 11/1976 | Baker | 403/231 |
| 4,289,363 | 9/1981 | Andersson et al. | |
| 4,447,099 | 5/1984 | French et al. | |
| 4,500,146 | 2/1985 | Peterson | 108/107 |
| 4,705,442 | 11/1987 | Fucci | 411/510 |
| 4,728,238 | 3/1988 | Chisholm et al. | 411/510 |
| 4,902,182 | 2/1990 | Lewis | 411/510 |
| 5,039,267 | 8/1991 | Wollar | 411/510 |
| 5,135,293 | 8/1992 | St. Germain et al. | |
| 5,279,231 | 1/1994 | Kolvites et al. | 108/107 |

FOREIGN PATENT DOCUMENTS

| | | | |
|---|---|---|---|
| 2356032 | 1/1978 | France | 108/109 |
| 0129111 | 6/1991 | Japan | 403/326 |

Primary Examiner—Edward K. Look
Assistant Examiner—Christopher Verdier
Attorney, Agent, or Firm—McHale & Slavin

[57] ABSTRACT

A storage locker constructed of recyclable thermoplastic that utilizes insertion tabs and sockets molded into the sides, top, bottom, front and side panels for permanent interlocking without the need of conventional fasteners. The storage locker is assembled on site by inserting the tabs of the appropriate panel into the socket receptacles of an adjoining panel. Assembly of a basic locker requires snap attachment of the side walls to the top and bottom panel. A front frame, preassembly with a hinged door panel, is snap attached to the structure to complete the assembly wherein the structure is available for mounting directly to a wall. For a stand alone locker assembly, a perforated rear panel is available for attachment to the rear of the locker by use of locker pins. The rear panel provides aeration and allows various hook placement for hanging items. Shelves are available in either fixed or adjustable disposition. Sides, top, and bottom panels include provisions for attaching additional lockers in a stacked or gang configuration.

20 Claims, 5 Drawing Sheets

FIG. 7
FIG. 8
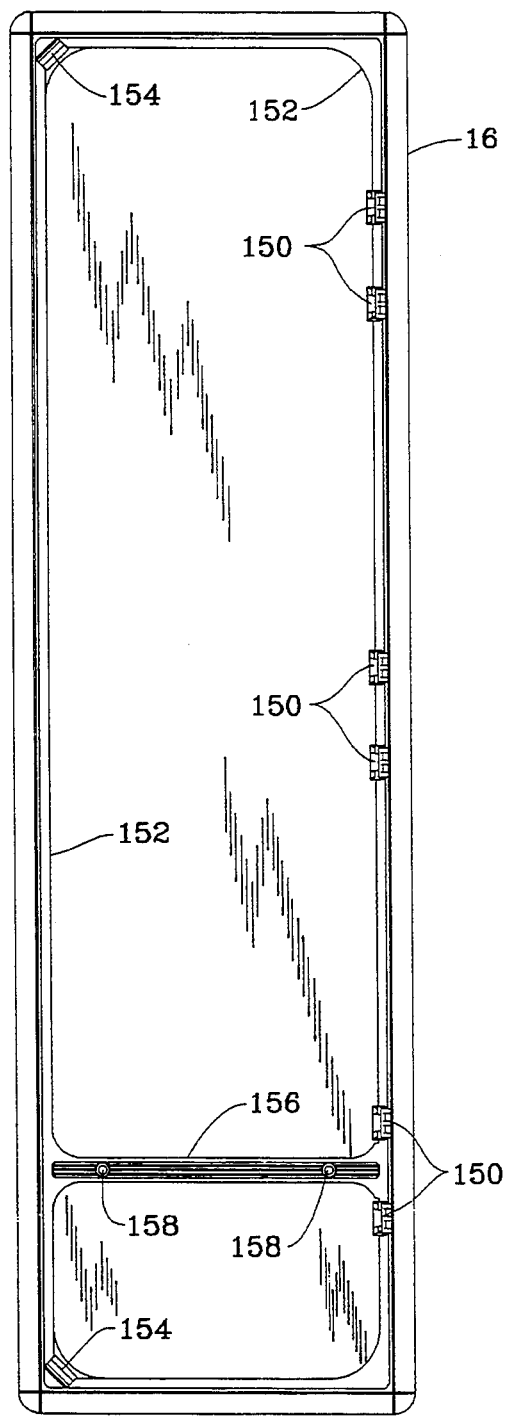
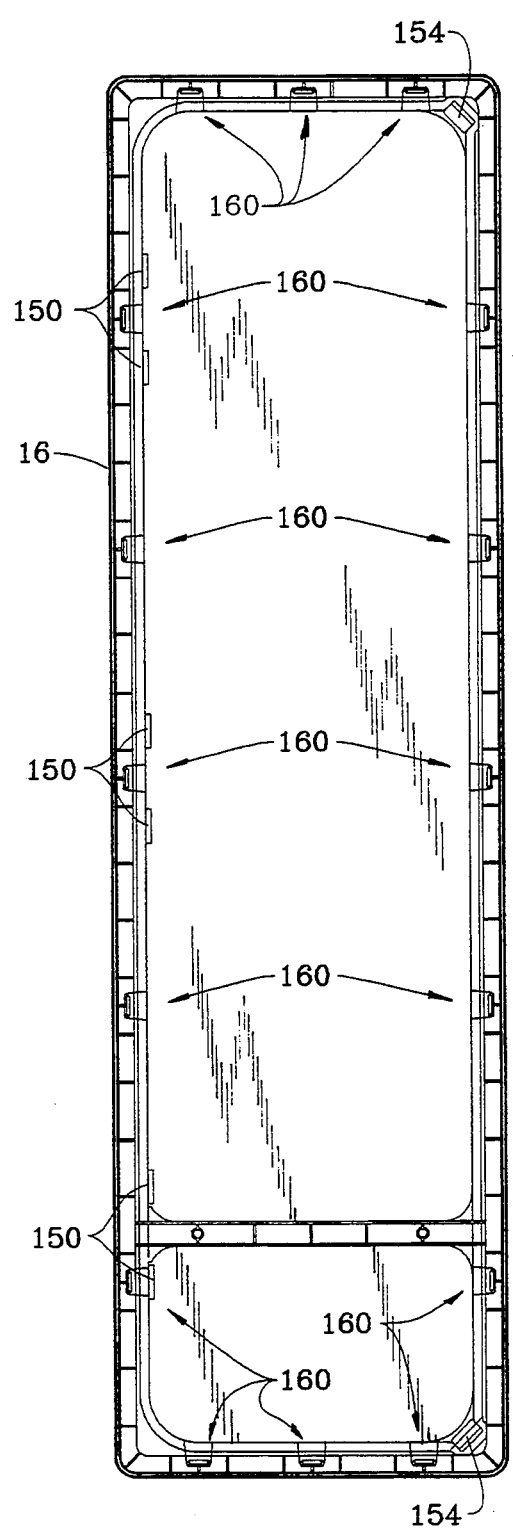

THERMOPLASTIC LOCKER CONSTRUCTION

FIELD OF THE INVENTION

The present invention relates generally to the field of storage cabinets and, more particularly, to a storage locker constructed of recyclable thermoplastic components.

BACKGROUND INFORMATION

In the United States, storage lockers of the prior art can be found in most any school where they are provided for storage of books, clothing, and the like personal effects of attending students. Lockers can also be found in bus stations, airports, and in dressing rooms of most every professional sports organization. Actual use of a locker is limited only by one's imagination.

One problem with lockers of the prior art, to which this invention addresses, is the predominant use of steel. Conventional lockers are constructed of stamped steel that is painted and then assembled by use of numerous fasteners such as screws, rivets, nuts and bolts. The end product is a rectangular box with right angled edges leaving a fixture having little or no aesthetic appeal. Further, as elaborated below, the steel locker is affected by humidity, has sharp edges, is noisy in operation, easily vandalized, and can be used in only certain environments.

For example, placement of a steel locker in a high humidity room, such as a gymnasium dressing room, will quickly uncover flaws in the coating of the steel leading to unattractive rust. Even if the locker panel is properly coated, fasteners used for assembly are notorious for scaring the locker finish propagating the locker demise.

To save weight, steel locker construction demands that the panels are made from thin sheet metal. Thin sheet metal produces sharp edges that are dangerous to handle during shipping and assembly. Thin sheet metal is noisy in operation as the metal is susceptible to vibration and the hollow structure can create an echo chamber. In schools where lockers typically line the hallways, simultaneous opening and closing of multiple locker doors can create an unbearable noise level leading to class disruption. Further, thin steel metal panels are also prone to vandalism and once a door is kicked or punched with sufficient strength to dent the sheet metal, the locker can be rendered dysfunctional.

Finally, use of a steel locker in a corrosive environment is an expensive proposition due to the need for specialty coatings to prevent corrosion. Simply substituting plastic as the preferred material of construction will fail if prior art teachings are replicated. In addition, plastic fasteners such as screws, nuts, or rivets cannot duplicate the strength of metal fasteners and use of such presents a locker of questionable shear strength.

U.S. Pat. No. 4,289,363 issued to Andersson et al., attempted to resolve at least a portion of the problem by disclosing a sheet metal locker that is assembled without screws or rivets.

U.S. Pat. No. 5,135,293 issued to St-Germain et al., disclosed a metal storage locker having a door formed into a semi-circle providing resistance to vandalism.

U.S. Pat. 4,447,099 issued to French et al., disclosed a prefabricated light gauge sheet storage locker for use in a bedroom which simulates lockers used by professional sporting organization. The problems remain with all the aforementioned art due to the use of steel for material of construction.

Therefore, what is lacking in the art is a locker having all the strength of a steel locker without steel construction. Namely, a locker constructed of plastic components whose major components snap together to form a construction with durability greater than steel yet providing an aesthetically pleasing locker for residential application.

SUMMARY OF THE INVENTION

The present invention satisfies the aforementioned needs by teaching a plastic locker assembly that utilizes components having preformed insertion tabs available for coupling to socket receptacles located on adjoining panels. The locker is assembled on site by pressing the insertion tabs of the appropriate panel into the socket receptacles of the adjoining panel. The tabs "snap" into the respective socket permanently locking the components together. The storage locker can be fastened to a wall or, alternatively, employ a perforated rear panel to allow freestanding operation. Shelves can be mounted inside the locker by use of plastic locking pins and/or integrated snap connectors. Sides, top, and bottom panels include provisions for attaching additional lockers in a stacked or gang position.

Accordingly, a primary objective of the present invention is to provide a low cost recyclable storage locker whose major components, namely the top, bottom, sides and front panel are press locked together for instant assembly.

Another objective of the present invention is to provide a means for fastening a storage locker directly to a wall or, alternatively, employ a rear wall for a free standing structure.

Another objective of the present invention is to provide a locker that will endure corrosive and/or high humidity conditions without rusting or need for a secondary finishing.

Still another objective of the present invention is to provide a locker assembly that will significantly decrease installation costs by use of snap-together features which are molded into the component panels.

Yet still another objective of the present invention is to provide a lightweight locker that can be used in private homes, can be made to assimilate the lockers of professional athletes, allows integral indicia placement on the door, and can be colored without painting.

Still another objective of the present invention is to provide a locker assembly with fixed and/or adjustable shelves, bins and drawers.

Another objective of the present invention is to provide a locker capable of rattle free operation and whose components are dent resistant as well as absent sharp edges.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 7 is a front plane view of the front frame without the door;

FIG. 8 is a rear plane view of FIG. 7;

DETAILED DESCRIPTION OF THE PREFERRED EMBODIMENT

Figure 1:
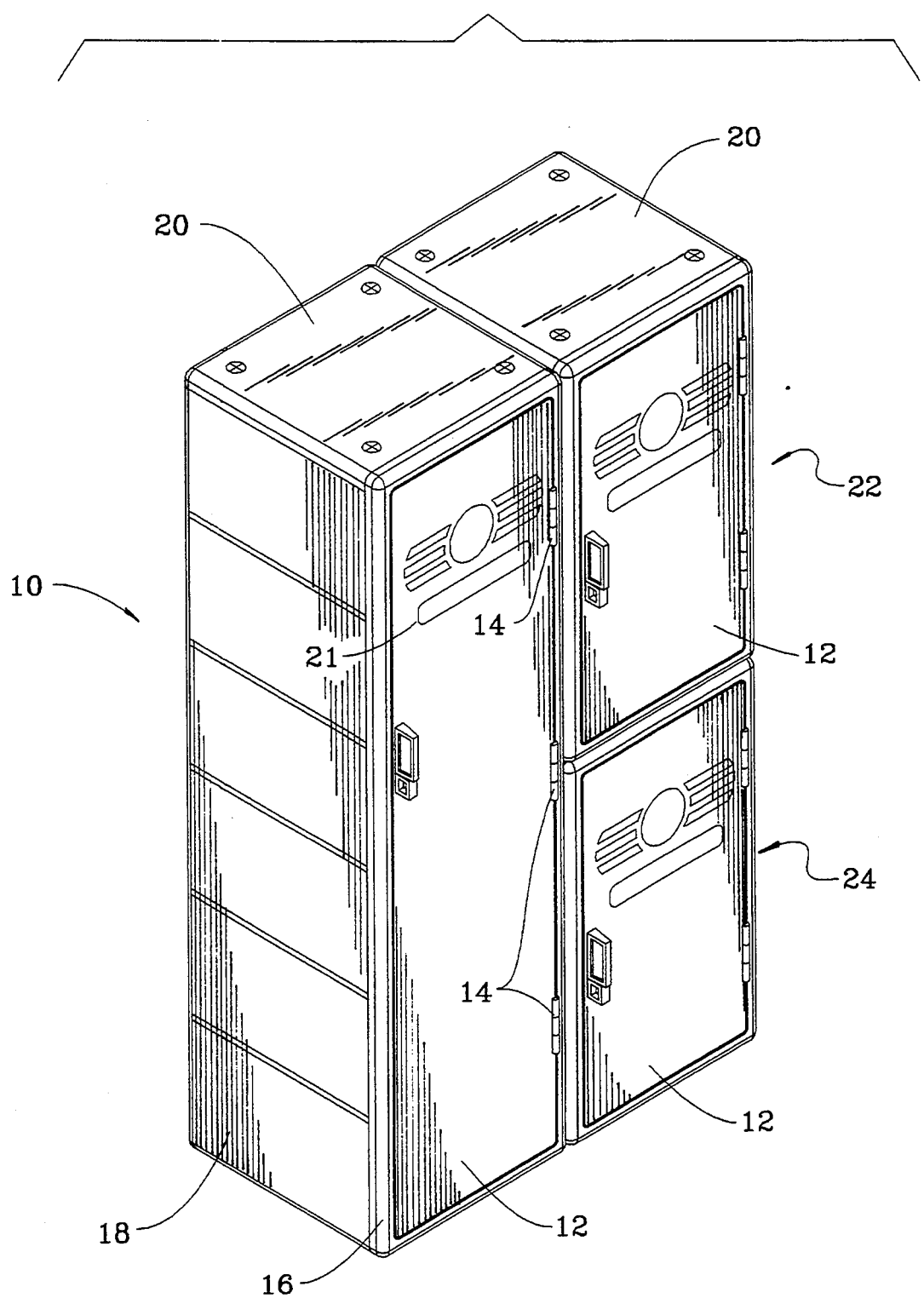
FIG. 1 is a perspective view of a single full size storage locker shown attached to two half sized lockers embodying the herein disclosed invention.

Although the invention has been described in terms of a specific embodiment, it will be readily apparent to those skilled in this art that various modifications, rearrangements and substitutions can be made without departing from the spirit of the invention. The scope of the invention is defined by the claims appended hereto. Corresponding reference numerals indicate corresponding components throughout the several views of the drawings.

Referring now to the drawings, FIG. 1 illustrates a storage locker 10 of the instant invention fully assembled having an overall height of approximately forty eight inches. The locker 10 utilizes a front door 12 rotatably coupled by hinges 14 to door frame 16. The door frame 16 is permanently attached by a latching means to the left side panel 18 and top panel 20 as well as a right side panel and bottom panel, not shown. Adjacent to the full sized locker 10 is shown two separate half-sized lockers 22 and 24 each having a height of approximately twenty four inches. The left side wall of locker 24 is coupled to a lower right side wall of locker 10 and to the bottom panel of locker 22. Likewise, the left side wall of locker 22 is coupled to an upper right side wall of locker 10 and to the top panel of locker 24. Each door 12 is molded from plastic allowing placement of raised indicia 21 thereon. It should be noted that for all purposes herein, the half sized lockers are identical in shape and assembly as the full sized locker 10 with the only difference limited to side wall height and lack of a fixed shelf.

Figure 2:
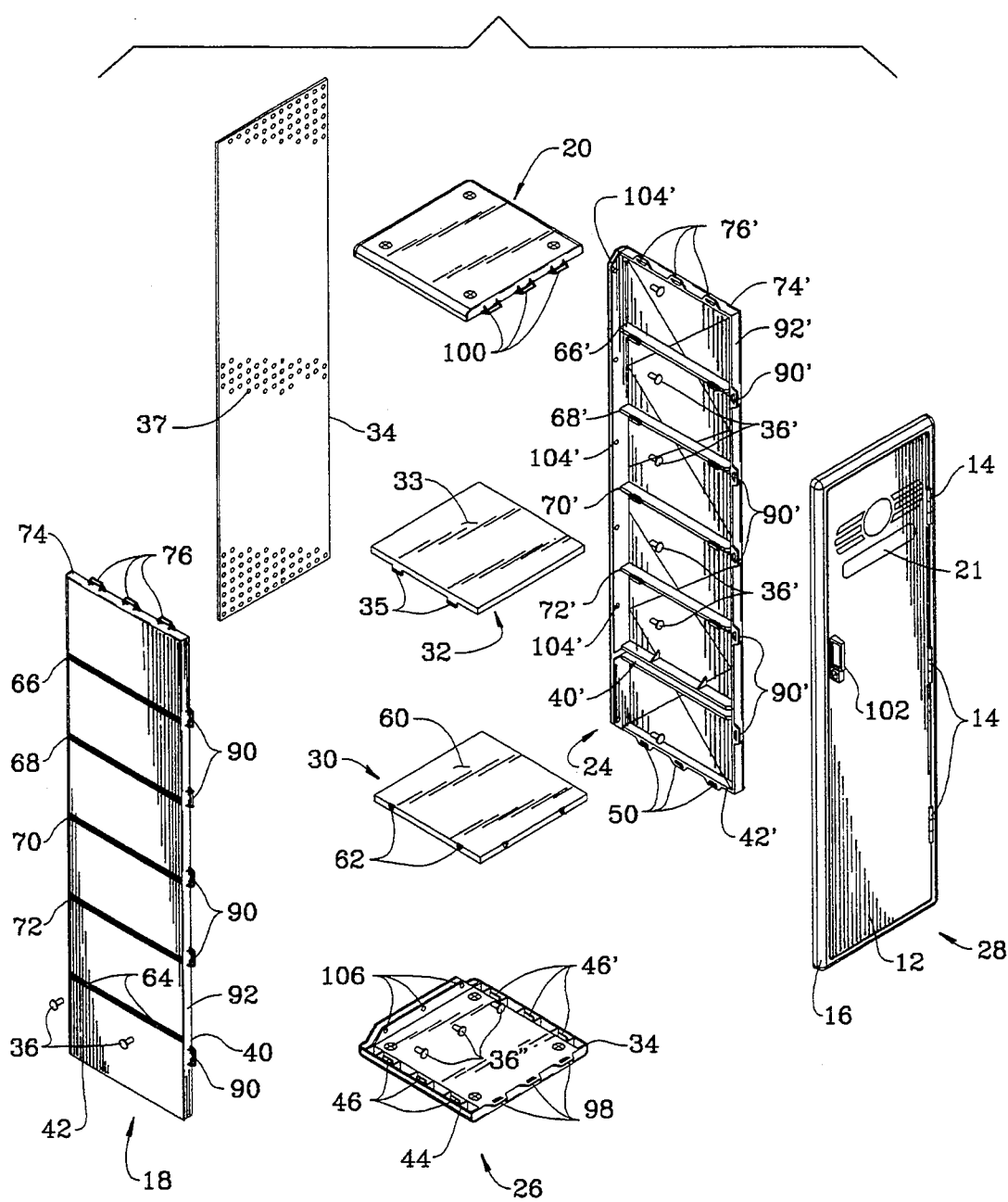
FIG. 2 is an exploded view of a single full size locker.

FIG. 2 illustrates the storage locker 10 in an exploded view positioned for assembly. A detailed description of each component and individual functionality follows this overall description. The base locker is defined by a first side wall 18 and a second side wall 24; a top end panel 20 and a bottom end panel 26; a front frame with a rotatable door panel 28 hingedly coupled to said frame; a fixed shelf 30; and at least one adjustable shelf 32 all molded from plastic material. The locker may be mounted directly to a wall, or use a pegboard panel 34 which can be permanently fastened to the locker for freestanding operation by use of uni-directional locking pins. If lockers are to be placed in a side by side arrangement or stacked, said locking pins are also utilized to permanently fasten a multiplicity of lockers in a fixed position.

Locker assembly is performed by pressing the bottom edge 42 of side wall 18 having three spaced apart socket receptacles, not shown, into a first side edge 44 of bottom end panel 26 having three spaced apart insertion tabs 46 which lock to the sockets upon insertion thereby permanently coupling side wall 18 to bottom end panel 26. Similarly, assembly of right side panel 24, which forms a mirror image of left side panel 18, is performed by pressing the bottom edge 42 of side wall 24 having three spaced apart socket receptacles 50, into second side edge 34 of bottom panel 26 having three spaced apart insertion tabs 46' which lock to the socket receptacles 50 upon insertion thereby permanently coupling side wall 24 to bottom panel 26.

Fixed shelf 30 is defined by a flat top 60 and four side edges depending therefrom. Each side edge has at least two through holes 62 for accepting locking pins. Side walls 18 and 24 include slot 40 and 40' respectively on the inner surface of each side wall for positioning the shelf 30 within the slots. Locking pins 36 are shown available for placement through side wall 18 holes 64 for permanently attaching shelf 30 into a fixed position. Similarly, side wall 24 includes through holes within slot 40' for insertion of locking pins to secure the opposite side of shelf 30 within slot 40.

Adjustable shelf 32 is available for attachment to shelf supports 66 and 66', 68 and 68', 70 and 70', and/or 72 and 72'. The top surface 33 of the adjustable shelf 32 has two outer edges with a means for releasably fastening to any of said shelf supports by use of depending tabs 35 which are operatively associated with said shelf supports. It is noted that placement of a single shelf 32 on shelf support 66 and 66' will allow sufficient distance between fixed shelf 30 for hanging coats and the like. Shelf supports have a dual function of reinforcing each side panel by use of cross panel molding.

The upper section of the locker is assembled by pressing top panel 20, having three spaced apart insertion tabs, not shown, to the top edge 74 of side wall 18 having three spaced apart socket receptacles 76 which permanently lock the components together. Similarly, the right side panel 24, which forms a mirror image of left side panel 18, is permanently locked by pressing the top panel 20 remaining three spaced apart insertion tabs, also not shown but located along the right side, to the top edge 74' of side wall 24 having three spaced apart socket receptacles 76' which permanently locks the side wall 24 to the top panel 20 upon insertion. For reference to the insertion tabs of top panel 20, it should be noted that bottom panel 26 is a mirror image of the top panel 20 and is fully interchangeable therewith.

Coupling front door assembly 28 to side wall 18 utilizes molded socket receptacles 90 which project outwardly from side edge 92 while side wall 24, which forms a mirror image of side wall 18, includes molded socket receptacles 90' projecting outwardly from the side edge 92'. Similarly, the forward edge of the bottom panel 26 has three molded socket receptacles 98 in the same form as upper panel 20 shown with socket receptacles 100. For locking purposes the door frame 16 includes the use of insertion tabs, shown in greater detail later in this specification but in the same format as set forth in the bottom panel 26, strategically located along the inner surface along the perimeter of the frame 16 for locking the frame 16 to side walls 18 and 24, and upper and lower panels 20 and 26 by pressing the frame 16 against the structure for snap assembly to the available latching means. For ease of assembly, the door 12 is preassembled before shipping by attachment to frame 16 using hinges 14. The door handle 102 further attaches to the door by use of integral snaps molded into the handle. The door 12 is formed from moldable plastic material wherein the outer surface of the door is available for placement of indicia 21 either in the form of placement thereon or molded during door formation using various designs depicting sporting activities and/or objects used in sporting events.

The perforated rear panel 34 is attached to each side wall panel by through holes 104' as shown on side wall 24 to panel holes 37 wherein locking pins 36' are inserted through to permanently fasten the panel 34 to each side wall. Lower panel 26 includes attachment holes 106 positioned along a raised lip at the rear of the panel 26 wherein locking pins 36" are available for permanent attachment of the lower portion of the rear panel 34 to the bottom panel 26. The upper panel 20 also includes through holes, not shown, for rigidly supporting the top portion of rear panel 34. The rear panel can be of conventional pegboard design wherein the holes 37 allow for placement of conventional plastic pegboard hooks for hanging clothing and the like items.

Figure 3:
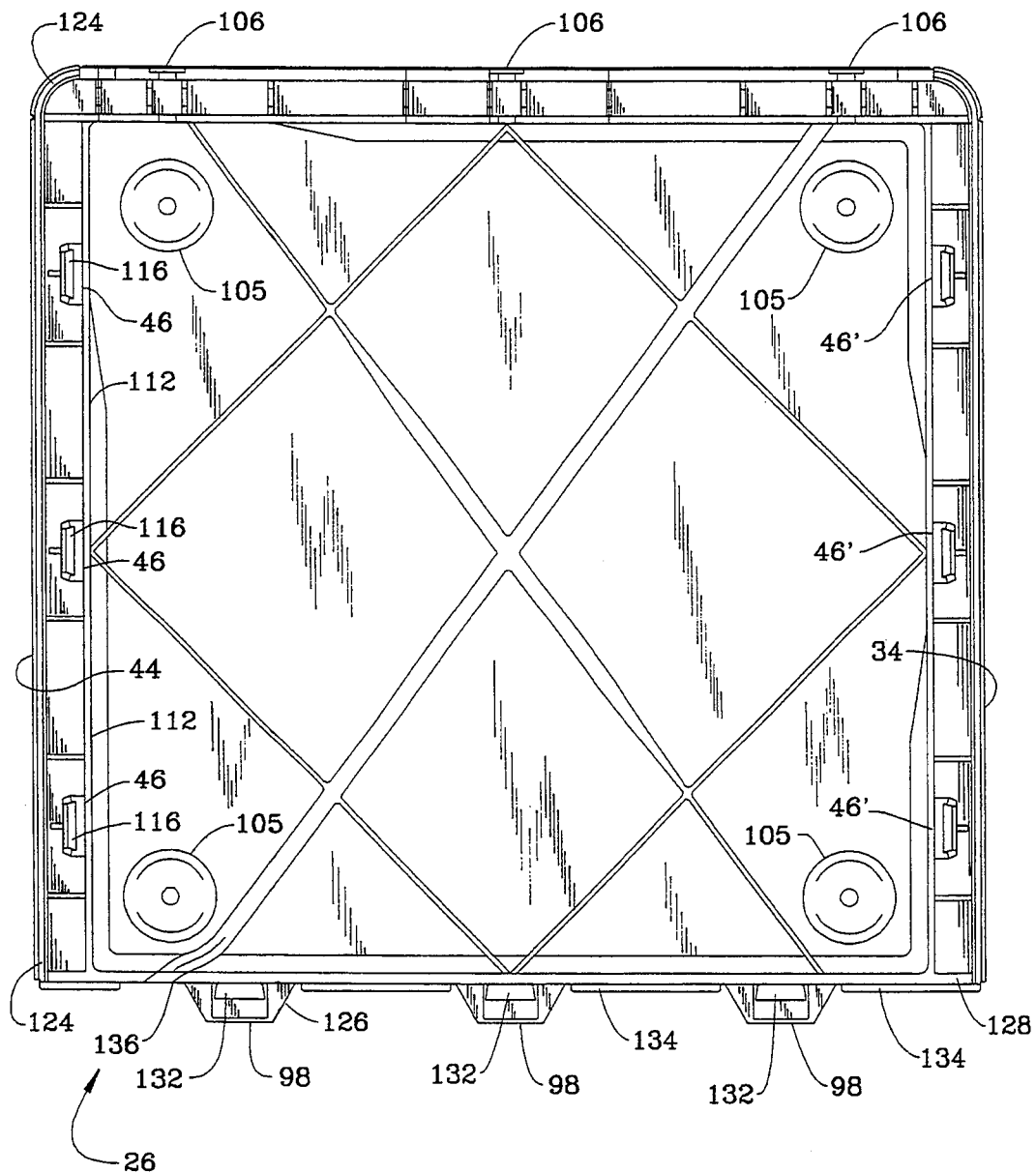
FIG. 3 is an enlarged plane view of the inner side surface of end panel used as either the top or bottom end panel shown in FIG. 2.
Figure 4:
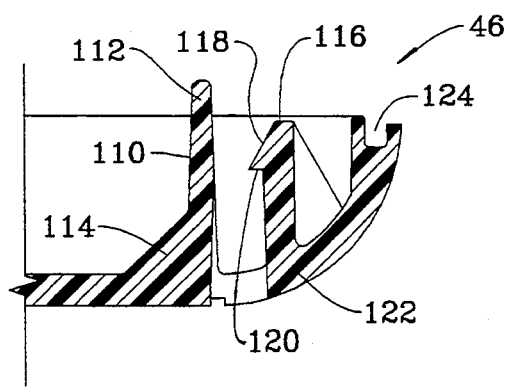
FIG. 4 is an enlarged fragmentary cross sectional side view of the insertion tab portion of the fastening mechanism.
Figure 5:
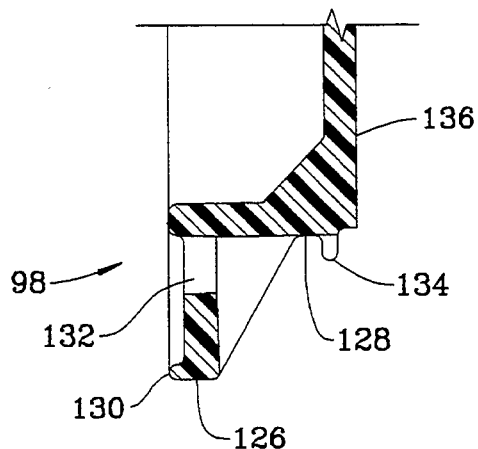
FIG. 5 is an enlarged fragmentary cross sectional side view of the socket receptacle portion of the fastening mechanism.

Now referring in general to FIGS. 3-5, an enlarged view of the bottom end panel 26 and latching means is provided to illustrate the integrated locking system of the instant invention as found on one end panel with a cross-sectional side view to illustrate the latching means. The end panel 26 is single piece of molded thermoplastic with four holes 105 for insertion of stabilizing feet for use in mounting to an additional unit wherein the holes accept a locking pin. As previously described, placed along left side edge 44 is three spaced apart insertion tabs 46 which consist of an alignment rail 110, also shown in FIG. 4, having an angular top section 112 and reinforced lower section 114. A projection spar 116 forms the basis of the insertion tab comprising an upwardly projecting finger having a sloped top portion 118 leading to latching hook surface 120 which will engage a socket receptacle. The lower portion 122 of the spar 116 permits deflection away from alignment rail 110 during assembly. Working as a seal and alignment means, slot 124 is placed along the outer edge of the insertion tab for engaging a portion of the socket receptacle. It is noted that the aforementioned insertion tabs are found on both side edges 34 and 44 of the lower 26 and upper cover 20 and the entire perimeter of the inner surface of door frame 16.

The socket receptacles 98 used on the bottom end panel 26, also shown in FIG. 5, are defined as molded projections 126 extending outwardly from edge 128 to a biasing tip 130. The angularly reinforced molded projections 126 encompass an aperture 132 sized to accommodate the projection spar 116 and more importantly, the latching hook surface of a spar. Alignment boss 134 projects outwardly from upper edge 128 at a predetermined distance from side edge 136.

Figure 6:
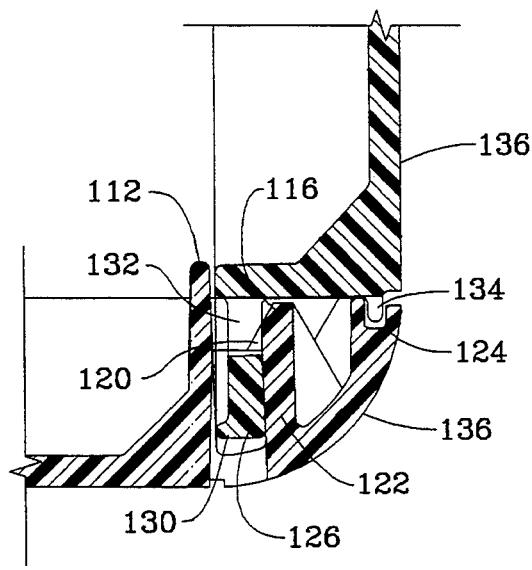
FIG. 6 is an enlarged fragmentary cross sectional side view of the insertion tab and socket receptacle shown in FIGS. 4 and 5 pressed together in a locked position.

FIG. 6 provides a cross sectional side view of the assembled coupling depicted in FIGS. 4 and 5. During assembly the biasing tip 130 of the molded projection 126 engages the angular top section of alignment rail 110 causing a deflection of top section 112 and projection spar 116 by use of tip slope 118. Upon full insertion the latching hook surface 120 of the projection spar 116 fits within the aperture 132 of the socket receptacle on molded projection 128 permanently locking the projection spar 116 in a fixed position. The biasing tip 130 maintains the molded projection 126 firmly against projection spar 116. Similarly, the reinforced lower portion 122 of the spar 116 permits deflection only during assembly and remains fixed in its upright position to prevent disengagement of the latching hook surface 120 from the aperture 132. Alignment boss 134 fits within slot 124 forming a tongue and groove assembly preventing access to the now locked components with the latching means hidden from external view by rounded end surface 136.

FIG. 7 depicts the front view of the door frame 16 without a door attached and FIG. 8 is a rear view of FIG. 7. The frame 16 has three hinge brackets 150 molded in the frame. Lip 152 encompasses the perimeter of the frame providing a backstop for the door and means for limiting access to locker contents. For applications where the door is not locked, magnets 154 are placed at the corners of the frame opposite the door hinges with corresponding metal pieces positioned on the inner surface of the door. Cross bracket 156 provides support for the permanent shelf with through holes 158 allowing insertion of locking pins. The rear view of the front frame 16 depicts the molded insertion tabs 160 located around the inner perimeter of the frame. The insertion tabs 160 are of the same configuration as the insertion tabs described and depicted in FIG. 4. To save material, locker construction utilizes conventional plastic reinforcement techniques known to those skilled in the art and illustrated throughout the Figures.

Figure 9:
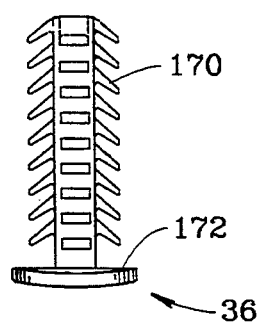
FIG. 9 is a side plane view of a locking pin.

FIG. 9 illustrates the locking pin 36 used for fastening the lower shelf and for attaching the optional rear perforated panel. In addition, locking pin 36 is used for attaching lockers together in a side by side and/or a stacked configuration. The pin 36 is molded from plastic having a plurality of angular shaped projections 170 permitting uni-direction insertion. The head 172 of the pin 36 is convex for biasing head 172 against projections 170 for locking components.

Figure 10:
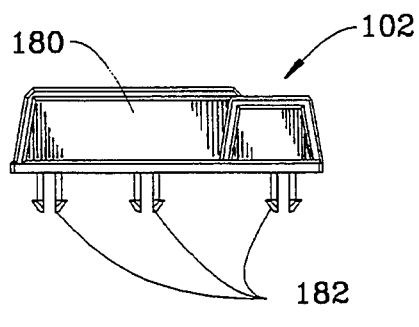
FIG. 10 is a side plane view of a door handle.

FIG. 10 sets forth a door handle 102 used with the instant device when locking the door in a closed position is not necessary, such as residential use. The handle has a body 180 formed from plastic and molded to assimilate a conventional locker handle. Attachment is by use of split tabs 182 molded into the handle which allow for a uni-direction insertion into the door of the locker.

It is to be understood that while we have illustrated and described certain forms of our invention, it is not to be limited to the specific forms or arrangement of parts herein describe and shown. It will be apparent to those skilled in the art that various changes may be made without departing from the scope of the invention.

We claim:

1. A locker apparatus for storing items comprising:
   a first end panel constructed of thermoplastic having an inner surface, an outer surface, four side edges and a plurality of through holes, the inner surface of said first end panel having a plurality of integrally molded insertion tabs formed along two opposing side edges with each of said insertion tabs having a locking surface, and a plurality of socket receptacles operatively associated with at least one of said side edges;
   a second end panel being constructed of thermoplastic forming a mirror image of said first end panel and being interchangeable therewith;
   a first side wall panel having an inner surface, an outer surface, four side edges and a plurality of through holes, three of the side edges of said first side wall panel having a plurality of integrally molded socket receptacles each providing an aperture operatively adapted for engaging a locking surface of an insertion tab extending therefrom, the inner surface of said first side wall panel having a means for mounting shelves thereto;

a second side wall panel being constructed of thermoplastic forming a mirror image of said first side wall panel and being interchangeable therewith;

at least one shelf for support of items thereon;

a rear wall panel operatively adapted for attachment to said end panels and said side walls;

a plastic front frame having an inner surface, an outer surface and four side edges forming a perimeter, the inner surface of said front frame having a latching means bordering said perimeter for attachment to said end panels and said side panels ;

a plastic rotatable door panel hingedly coupled to said front frame having a means for holding said door panel in a closed position and an outer surface operatively adapted for receiving indicia thereon;

a means for sealing said insertion tabs and said socket receptacles upon assembly;

a means for fastening said rear panel wall to said end panels and said side walls; and a means for fastening said locker apparatus to additional lockers in a stacked or gang position.

2. The locker according to claim 1 wherein said insertion tabs include an angularly shaped deflecting alignment rail juxtapositioned to a projection spar having a sloped top portion leading to a latching hook surface.

3. The locker according to claim 2 wherein said socket receptacles are defined by an outwardly extending projection with a biasing tip for biasing against the deflecting alignment rail of said an insertion tabs, said projection having an aperture sized to accommodate the latching hook surface on a projection spar of said insertion tab.

4. The locker according to claim 1 wherein said indicia is molded during said door panel construction.

5. The locker according to claim 1 wherein said means for fastening is defined as plastic locking pins, each having a cap and stem with a plurality of angular shaped projections pointing toward said cap permitting uni-directional insertion.

6. The locker according to claim 1 wherein said side walls include a means to releasably support a plurality of said shelves.

7. The locker according to claim 1 wherein each of said shelves is fixed to said side walls by said means for fastening.

8. The locker according to claim 1 wherein said rear panel is a perforated pegboard panel receptive to holding conventional pegboard hooks.

9. The locker according to claim 1 wherein said means for sealing is defined as a tongue and groove configuration molded into adjoining panels.

10. A locker apparatus for storing items comprising:
a first end panel and a second end panel, each of said end panels having an inner surface, an outer surface and four side edges, the inner surface of each of said panels having a latching means operatively associated therewith and bordering two of said side edges that are opposing, and a plurality of socket receptacles being operatively associated with one of said remaining edges;

a first side panel and a second side panel, each of said side panels having an inner surface, an outer surface and four side edges with a plurality of socket receptacles disposed along an outer surface of three of said side edges, the inner surface of each of said side panels having a means for mounting shelves thereto;

a plastic front frame having an inner surface, an outer surface and four side edges forming a perimeter, the inner surface of said front frame having a latching means formed integral therewith and bordering said perimeter; and a rotatable door panel hingedly coupled to said front frame;

wherein said latching means engage said socket receptacles for permanently coupling said end panels, said side panels and said front frame into a box-like structure forming a cavity accessible by rotation of said door panel.

11. The locker according to claim 10 wherein said latching means is further defined as an insertion tab molded near a side edge having a locking surface available for engaging a socket receptacle.

12. The locker according to claim 10 wherein said end panels are of integrally molded thermoplastic construction and interchangeable in position.

13. The locker according to claim 11 wherein each of said socket receptacles are further defined as an integrally molded projection extending from a side edge and further having an aperture operatively adapted for engaging the locking surface of said insertion tab.

14. The locker according to claim 10 wherein said second side panel is a mirror image of said first side panel.

15. The locker according to claim 10 wherein said door panel includes raised indicia, is formed from plastic material and an outer surface of said door panel is operatively adapted for receiving said raised indicia.

16. The locker according to claim 15 wherein said indicia is molded during said door panel construction.

17. The locker according to claim 10 wherein said means for mounting shelves to said side panels is further defined as two elongated slots located on opposing shelf supports receptive to an adjustable shelf having dependant tabs for releasable insertion thereto.

18. The locker according to claim 10 wherein said end panels and said side panels include a means for mounting to a wall.

19. The locker according to claim 10 wherein said front frame includes a means for holding said door panel in a closed position.

20. The locker according to claim 10 wherein the side edges of said front frame include a means for sealing said latching means from external access upon assembly.

* * * * *